(12) United States Patent
Chen et al.

(10) Patent No.: US 8,386,552 B2
(45) Date of Patent: Feb. 26, 2013

(54) FOURIER TRANSFORM PROCESSING AND TWIDDLE FACTOR GENERATION

(75) Inventors: Ning Chen, Austin, TX (US); Jayakrishnan C. Mundarath, Austin, TX (US); Pornchai Pawawongsak, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1197 days.

(21) Appl. No.: 12/211,892

(22) Filed: Sep. 17, 2008

(65) Prior Publication Data
US 2010/0070551 A1    Mar. 18, 2010

(51) Int. Cl.
*G06F 15/00* (2006.01)
(52) U.S. Cl. ......... 708/405; 708/400; 708/403; 708/404
(58) Field of Classification Search .................. None
See application file for complete search history.

(56) References Cited

U.S. PATENT DOCUMENTS

| | | | | |
|---|---|---|---|---|
| 4,768,159 A | * | 8/1988 | Gray et al. | 708/405 |
| 6,366,937 B1 | * | 4/2002 | Shridhar et al. | 708/409 |
| 6,421,696 B1 | * | 7/2002 | Horton | 708/404 |
| 7,454,452 B2 | * | 11/2008 | Sohm | 708/404 |
| 7,849,123 B2 | * | 12/2010 | Lai et al. | 708/404 |
| 2007/0106718 A1 | | 5/2007 | Shum et al. | |

OTHER PUBLICATIONS

J. Chi and S. Chen, "An Efficient FFT Twiddle Factor Generator," 12th European Signal Processing Conference (EUSIPCO), Vienna, Austria, Sep. 2004.

* cited by examiner

*Primary Examiner* — Michael D Yaary
(74) *Attorney, Agent, or Firm* — Joanna G. Chiu

(57) ABSTRACT

In a data processing system, having a twiddle factor unit, a method for performing a mixed-radix discrete Fourier transform (DFT) having a block size, N, and a maximum block size, Nmax, wherein the maximum block size includes a radix that is not a power of 2 is provided. The method includes receiving a delta value at an input of the twiddle factor unit, the delta value representing a ratio of a modified maximum bock size to the block size, wherein the modified maximum block size is a power of 2. The method further includes using the delta value to obtain a step size for generating indices of a look-up table stored within the twiddle factor unit, wherein the look-up table stores real and imaginary components of twiddle factors corresponding to a set of block sizes of the DFT.

16 Claims, 4 Drawing Sheets

| N | m2 | m3 | m5 | Δ | Δ$_q$ |
|---|---|---|---|---|---|
| 12 | 2 | 1 | 0 | 2073600 | 89478485 |
| 24 | 3 | 1 | 0 | 1036800 | 44739243 |
| 36 | 2 | 2 | 0 | 691200 | 29826162 |
| 48 | 4 | 1 | 0 | 518400 | 22369621 |
| 60 | 2 | 1 | 1 | 414720 | 17895697 |
| 64 | 6 | 0 | 0 | 388800 | 16777216 |
| 72 | 3 | 2 | 0 | 345600 | 14913081 |
| 96 | 5 | 1 | 0 | 259200 | 11184811 |
| 108 | 2 | 3 | 0 | 230400 | 9942054 |
| 120 | 3 | 1 | 1 | 207360 | 8947849 |
| 128 | 7 | 0 | 0 | 194400 | 8388608 |
| 144 | 4 | 2 | 0 | 172800 | 7456540 |
| 180 | 2 | 2 | 1 | 138240 | 5965232 |
| 192 | 6 | 1 | 0 | 129600 | 5592405 |
| 216 | 3 | 3 | 0 | 115200 | 4971027 |
| 240 | 4 | 1 | 1 | 103680 | 4473924 |
| 256 | 8 | 0 | 0 | 97200 | 4194304 |
| 288 | 5 | 2 | 0 | 86400 | 3728270 |
| 300 | 2 | 1 | 2 | 82944 | 3579139 |
| 324 | 2 | 4 | 0 | 76800 | 3314018 |
| 360 | 3 | 2 | 1 | 69120 | 2982616 |
| 384 | 7 | 1 | 0 | 64800 | 2796203 |
| 432 | 4 | 3 | 0 | 57600 | 2485513 |
| 480 | 5 | 1 | 1 | 51840 | 2236962 |
| 512 | 9 | 0 | 0 | 48600 | 2097152 |
| 540 | 2 | 3 | 1 | 46080 | 1988411 |
| 576 | 6 | 2 | 0 | 43200 | 1864135 |
| 600 | 3 | 1 | 2 | 41472 | 1789570 |
| 648 | 3 | 4 | 0 | 38400 | 1657009 |
| 720 | 4 | 2 | 1 | 34560 | 1491308 |
| 768 | 8 | 1 | 0 | 32400 | 1398101 |
| 864 | 5 | 3 | 0 | 28800 | 1242757 |
| 900 | 2 | 2 | 2 | 27648 | 1193046 |
| 960 | 6 | 1 | 1 | 25920 | 1118481 |
| 972 | 2 | 5 | 0 | 25600 | 1104673 |
| 1024 | 10 | 0 | 0 | 24300 | 1048576 |
| 1080 | 3 | 3 | 1 | 23040 | 994205 |
| 1152 | 7 | 2 | 0 | 21600 | 932068 |
| 1200 | 4 | 1 | 2 | 20736 | 894785 |
| 1536 | 9 | 1 | 0 | 16200 | 699051 |
| 2048 | 11 | 0 | 0 | 12150 | 524288 |
| 4096 | 12 | 0 | 0 | 6075 | 262144 |

*FIG. 3*

FOURIER TRANSFORM PROCESSING AND TWIDDLE FACTOR GENERATION

BACKGROUND

1. Field

This disclosure relates generally to signal processing, and more specifically, to Fourier transform processing and twiddle factor generation.

2. Related Art

Increasingly signal processing applications require implementation of several different sizes of Fourier transforms, such as Fast Fourier Transforms (FFTs) and Discrete Fourier Transforms (DFTs). By way of example, 3GPP long term evolution (LTE) requires over 40 different sizes of the Fourier transforms. Typically, the Fourier transforms are computed using twiddle factors. In particular, twiddle factors are the coefficients that are used to compute the FFTs and DFTs. Prior to computing the Fourier transforms, the twiddle factors are generated. The Fourier transforms are then computed using the twiddle factors that may be stored in look up tables.

In traditional approaches to computing the Fourier transforms, twiddle factors are duplicated across several look up tables. This is particularly a problem while computing the Fourier transforms based on mixed radices. Duplication of the twiddle factors across several look up tables results in inefficient use of storage in signal processors. Accordingly, there is a need for improved systems and methods for computing the Fourier transforms using twiddle factors.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 3 is a table illustrating different cases for generating twiddle factor indices;

DETAILED DESCRIPTION

Figure 1:
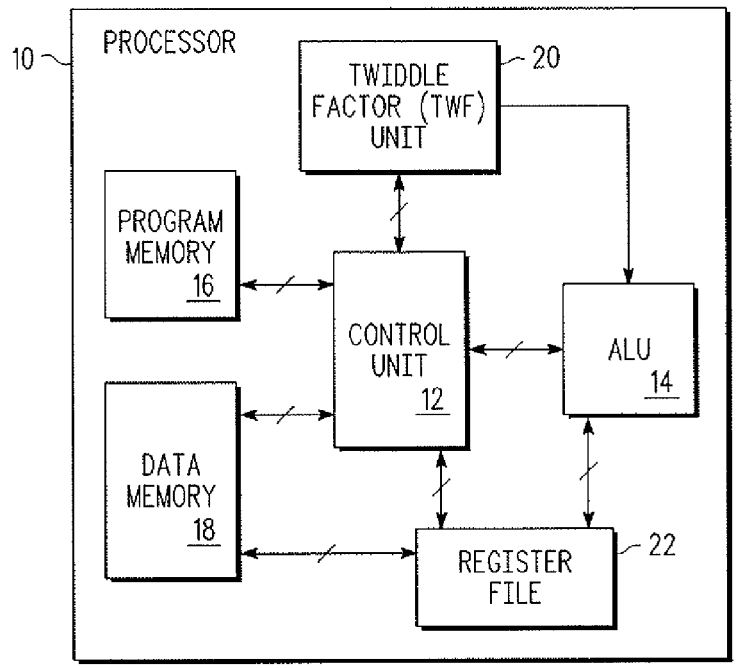
FIG. 1 is block diagram of a processor for Fourier transform processing.

In one aspect, in a data processing system, having a twiddle factor unit, a method for performing a mixed-radix discrete Fourier transform (DFT) having a block size, N, and a maximum block size, Nmax, wherein the maximum block size includes a radix that is not a power of 2 is provided. The method includes receiving a delta value at an input of the twiddle factor unit, the delta value representing a ratio of a modified maximum bock size to the block size, wherein the modified maximum block size is a power of 2. The method further includes using the delta value to obtain a step size for generating indices of a look-up table stored within the twiddle factor unit, wherein the look-up table stores real and imaginary components of twiddle factors corresponding to a set of block sizes of the DFT. The method further includes in response to each generated index, outputting from the look-up table, a real and imaginary component of the twiddle factor corresponding to the DFT having the block size N.

In another aspect, a data processing system which performs a mixed-radix discrete Fourier transform (DFT) having a block size, N, and a maximum block size, Nmax, wherein the maximum block size includes a radix that is not a power of 2 is provided. The data processing system includes an input which receives a delta value representing a ratio of a modified maximum block size to the block size, wherein the modified maximum block size is a power of 2. The data processing system further includes an increment calculator which uses the delta value to generate a step size. The data processing system further includes a start value calculator which uses the delta value to generate a plurality of start values. The data processing system further includes a plurality of twiddle factor generators, each twiddle factor generator comprising a first look-up table storing first components of twiddle factors corresponding to a set of block sizes of the DFT and a second look-up table storing second components of the twiddle factors corresponding to the set of block sizes of the DFT, and wherein each twiddle factor generator uses the step size and a corresponding one of the plurality of start values to generate indices for each of the first and second look-up tables, and, in response to each generated index, provides a real component and an imaginary component, from the first and second look-up tables, of a twiddle factor corresponding to the DFT having the block size, N.

In yet another aspect, a method including receiving a discrete Fourier transform (DFT) block size, N, wherein the block size N includes a first radix that is a power of 2 and a second radix that is not a power of 2 is provided. The method further includes generating an exponent corresponding to each of the first radix and the second radix. The method further includes using the generated exponents to generating a first delta value representing a ratio of a maximum block size to the block size, wherein the maximum block size includes at least one radix that is not a power of 2. The method further includes generating a second delta value representing a ratio of a modified maximum block size to the block size, wherein the modified maximum block size is a power of 2. The method further includes based on the second delta value, generating at least one look-up table corresponding to twiddle factors of the DFT having the block size, N. The method further includes storing the at least one look-up table for use in performing a DFT transform of a communications signal.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into different conductors carrying subsets of these signals. Therefore, many options exist for transferring signals.

The terms "assert" or "set" and "negate" (or "deassert" or "clear") when used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Brackets are used herein to indicate the conductors of a bus or the bit locations of a value. For example, "bus 60 [7:0]" or "conductors [7:0] of bus 60" indicates the eight lower order conductors of bus 60, and "address bits [7:0]" or "ADDRESS [7:0]" indicates the eight lower order bits of an address value.

FIG. 1 is block diagram of a processor 10 that can be used for Fourier transform processing, such as discrete Fourier transform (DFT) processing. Processor 10 may include a control unit 12, an arithmetic logic unit (ALU) 14, a program memory 16, a data memory 18, a twiddle factor (TWF) unit 20, and a register file 22. Control unit 12 may control the processing of signals by processor 10. ALU 14 may perform various arithmetic and logic operations under the direction of control unit 12. Program memory 16 may be used to store instructions, code, or other programmatic elements that may be decoded by control unit 12. Although not shown, program memory 16 may include both volatile and non-volatile memory components. Data memory 18 may be used to store data. Twiddle factor unit 20 may be used to generate twiddle factors based on input from control unit 12. Twiddle factors may then be used as multiplying factors in ALU 14. By way of example, control unit 12 may provide relevant parameters to twiddle factor unit 20 by decoding instructions stored in program memory 16. Twiddle factor unit 20 may then generate appropriate twiddle factors based on the relevant parameters. As used herein, the term twiddle factor includes, but is not limited to, exponential coefficients used to compute Fourier transforms, including but not limited to discrete Fourier transforms (DFTs). For example, a twiddle factor may have a complex value of the form: $W(k)=e^{-j2\pi ki\Delta/Nmax}$, where Nmax is the maximum FFT or DFT block size, k=0, 1, 2, ..., and i=0, 1, 2, .... In one embodiment, a DFT, with a block size of N, may include mixed radixes, including radixes that are a power of 2 and 3. Additionally and/or alternatively, the DFT may include radixes that are a power of 2, 3, and/or 5. Twiddle factors may be generated using real and imaginary parts, such as $W(k)=\cos(2\pi k/Nmax)-j\sin(2\pi k/Nmax)$. Although FIG. 1 shows a specific number of elements interconnected in a specific fashion, processor 10 may include additional and/or fewer elements interconnected in a different fashion.

By way of example, ALU 14 may receive a time domain signal from register file 22 and using real and imaginary components of the twiddle factors, from twiddle factor unit 20, may generate a frequency domain signal corresponding to the time domain signal. The time domain signal may be any communication signal, such as a QAM modulated communication signal. TWF generator 20 may be used to produce the twiddle factors that are used to precode the time domain signal to generate a precoded signal. By way of example, the precoded communication signal may be provided by a user equipment that incorporates TWF generator 20 and a DFT algorithm implemented in ALU 14. The user equipment may communicate using the precoded signal for an uplink transmission to a base station. For example, TWF generator 20 may be used to automatically generate eight parallel streams of twiddle factors during the FFT/DFT operation. The twiddle factors are fed to a multiplexer in ALU 20 and are used as multiplying factors. In one embodiment, a twiddle factor is a complex value of the form:

$W(k)=e^{-j2\pi ki/D}$, where D is the FFT or the DFT block size and k=0, 1, 2, ... and i=0, 1, 2, ....

Figure 2:
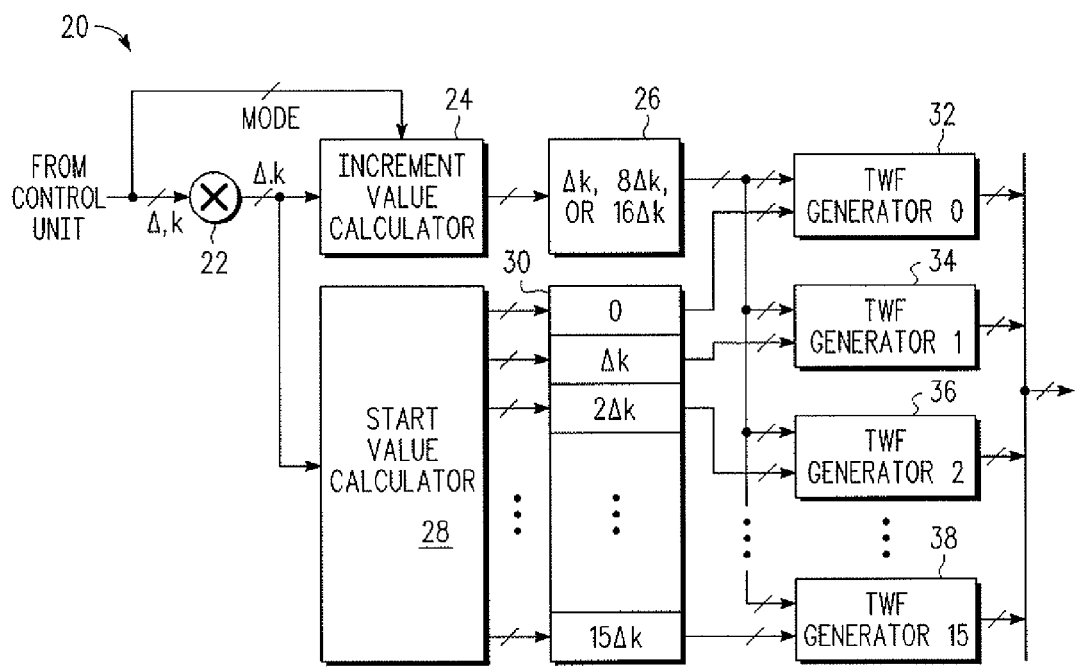
FIG. 2 is block diagram of a twiddle factor unit corresponding to the processor of FIG. 1.

FIG. 2 is block diagram of a twiddle factor unit 20 corresponding to processor 10 of FIG. 1. Twiddle factor unit 20 may include a multiplier 22, an increment value generator 24, a start value calculator 28, a storage 26, a storage 30, a TWF generator 0 32, a TWF generator 1 34, a TWF generator 2 36, and a TWF generator 15 38. In one embodiment, twiddle factor unit 20 may generate twiddle factors based on inputs from control unit 12. In one embodiment, twiddle factor unit 20 may receive a setup instruction and after being setup, twiddle factor unit 20 may receive a run instruction. As part of the setup instruction, twiddle factor unit 20 may receive a twiddle.counter.set instruction or a twiddle.counter.k instruction. The twiddle.counter.set instruction may program all relevant parameters associated with twiddle factor unit 20. On the other hand, twiddle.counter.k instruction may program only a k value. By way of example, twiddle factor unit 20 may receive a $\Delta$ value, a k value, and a MODE value. In one embodiment, the MODE value may indicate the number of output twiddle factors per cycle. In one embodiment, the $\Delta$ value may represent a ratio of the maximum block size to the block size (Nmax/N). Multiplier 22 may multiply the $\Delta$ value and the k value to generate a $\Delta k$ value. In one embodiment, increment value calculator 24 may receive the $\Delta k$ value and generate a step size or an index increment. By way of example, the step size can be $\Delta k$, $8\Delta k$, or $16\Delta k$, according to the number of tables (1, 8, of 16 tables, for example) to be used for performing the DFT/FFT operation. In one embodiment, once the run instruction is received, start value calculator 28 may calculate start values, such as 0, $\Delta k$, $2\Delta k$, ... or $15\Delta k$. In one embodiment, start value calculator may comprise a network of adders that can perform the operations listed in Table 1 below.

| Start Value | Calculation |
| --- | --- |
| $3\Delta k$ | $2\Delta k + \Delta k$ |
| $5\Delta k$ | $4\Delta k + \Delta k$ |
| $6\Delta k$ | $4\Delta k + 2\Delta k$ |
| $7\Delta k$ | $8\Delta k - \Delta k$ |
| $9\Delta k$ | $8\Delta k + \Delta k$ |
| $10\Delta k$ | $8\Delta k + 2\Delta k$ |
| $11\Delta k$ | $8\Delta k + 3\Delta k$ |
| $12\Delta k$ | $8\Delta k + 4\Delta k$ |
| $13\Delta k$ | $8\Delta k + 5\Delta k$ |
| $14\Delta k$ | $16\Delta k - 2\Delta k$ |
| $15\Delta k$ | $16\Delta k - \Delta k$ |

Table 1 is merely exemplary and other start values may be calculated using similar or other processing, as shown above. The start values generated by start value calculator 28, for example, may be stored in storage 30. Respective start values may then be communicated to one of the twiddle factor generators: TWF generator 0 32, TWF generator 1 34, TWF generator 2 36, or TWF generator 15 38. Thus, for example, TWF generator 0 32 may receive the 0 start value; TWF generator 1 34 may receive the $\Delta k$ start value; TWF generator 2 36 may receive the $2\Delta k$ start value; and TWF generator 15 38 may receive the $15\Delta k$ start value. Although FIG. 2 shows a specific number of components arranged in a specific manner, fewer or higher number of components arranged differently may be used to achieve the functionality associated with FIG. 2.

FIG. 3 is a table 50 illustrating different cases for generating twiddle factor indices. Table 50 may include a set of rows and columns, including columns 52, 54, 56, 58, 60, and 62. Column 52 corresponds to various values of N, which represents the block size. Column 54 relates to various values of radix m2, column 56 relates to various values of radix m3, and column 58 relates to various values of radix m5. Column 60 relates to various values of $\Delta$, which represents a delta value. Column 62 relates to various values of $\Delta$, which relate to step sizes for generating indices of a look table, such as table 50.

In one embodiment, block size N may include only one radix that is a power of 2 (i.e., N is a power of 2). In another embodiment, block size N may include at least one radix that is a power of 2 and at least one radix that is not a power of 2. Although FIG. 3 shows one table, the information stored in table 50 may be distributed across many tables. In addition, table 50 can be structured in other forms, including computer data structures of other kind.

Figure 4:
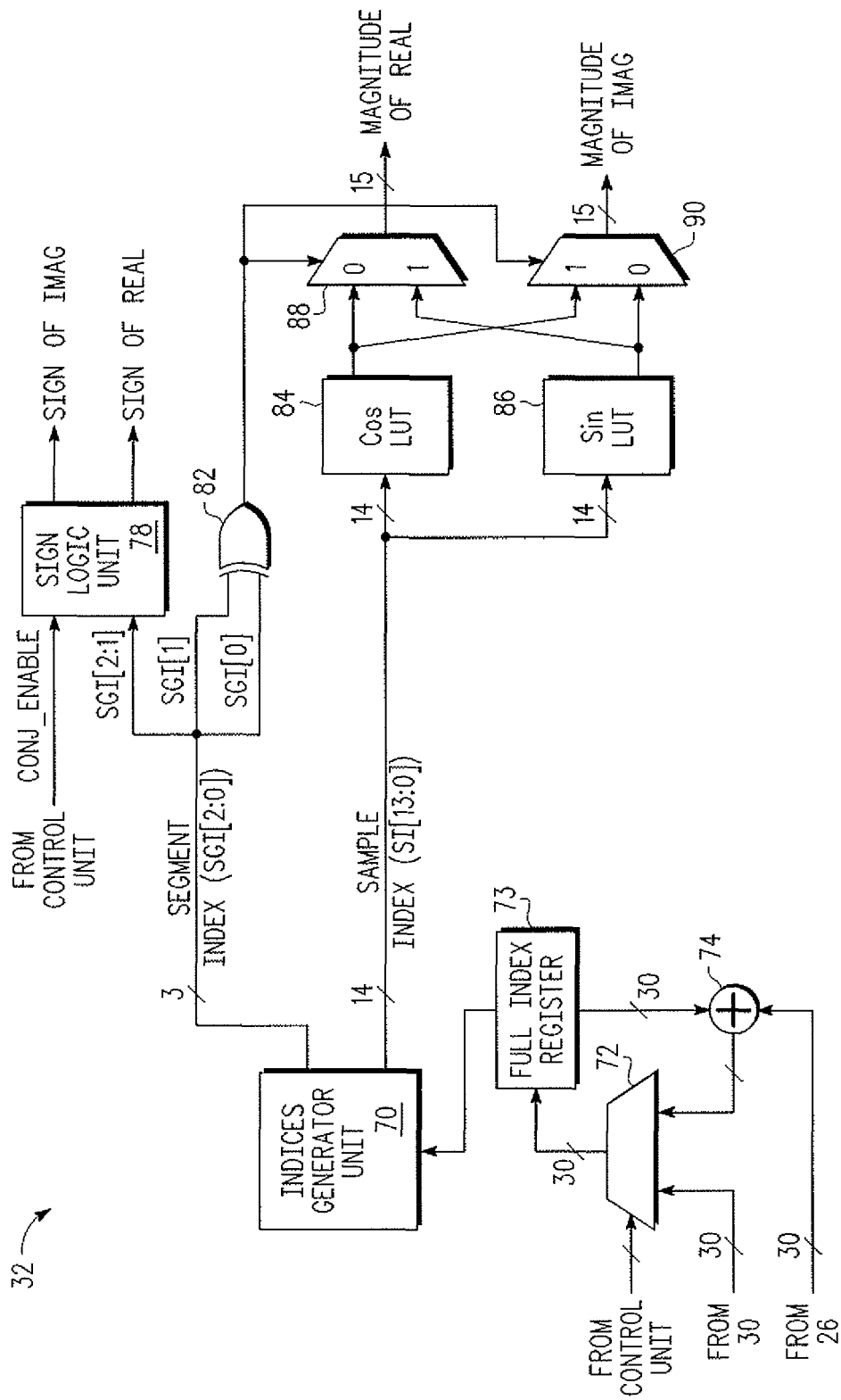
FIG. 4 is block diagram illustrating a twiddle factor generator corresponding to the twiddle factor unit of FIG. 2.

FIG. 4 is a block diagram illustrating a twiddle factor (TWF) generator 32 corresponding to the twiddle factor unit of FIG. 2. TWF generator 32 may include an indices generator unit 70, a multiplexer 72, an adder 74, a sign logic unit 78, a rounding unit 80, an exclusive-OR gate 82, a Cos LUT 84, a Sin LUT 86, and multiplexers 88 and 90. Indices generator unit 70 receives a start value (FROM 30) and an increment (FROM 26). During initialization, a start value is loaded into full index register 73. At every cycle after that the value stored in full index register 73 is incremented by the increment value and the output is loaded into full index register 73. The selection between the loading of the start value and the summed value is made using multiplexer 72 under the control of a signal from the control unit. Indices generator unit 70 generates a segment index (for example, 3 bits related to SEGMENT INDEX) and a sample index (for example, 14 bits related to SAMPLE INDEX). As an example, segment index may provide an index to one of the eight segments of a sine wave. As an example, sample index may provide index within the first segment of the sine wave. As part of generation of the segment index, lower 13 bits of the full index may be rounded off. Cos LUT look up table 84 may generate a cosine value corresponding to a segment of the cosine wave based on a 14 bit sample index value. Sin LUT look up table 86 may generate a sine value corresponding to a segment of the sine wave based on the same 14 bit sample index value. The cosine value and the sine value may be swapped based on the segment index value using exclusive OR gate 82 and multiplexers 88 and 90, as shown in FIG. 4. The output of multiplexer 88 provides a 15 bit value corresponding to the magnitude of the real part of the twiddle factor. The output of multiplexer 90 provides a 15 bit value corresponding to the magnitude of the imaginary part of the twiddle factor. Using the segment index value, sign logic unit 78 may generate a sign for the real part and a sign for the imaginary part of the twiddle factor. Sign logic unit 78 may further receive a CONJ_ENABLE signal form the control unit. Based on a state of the CONJ_ENABLE signal, sign logic unit may invert the sign of the imaginary part of the twiddle factor.

Figure 5:
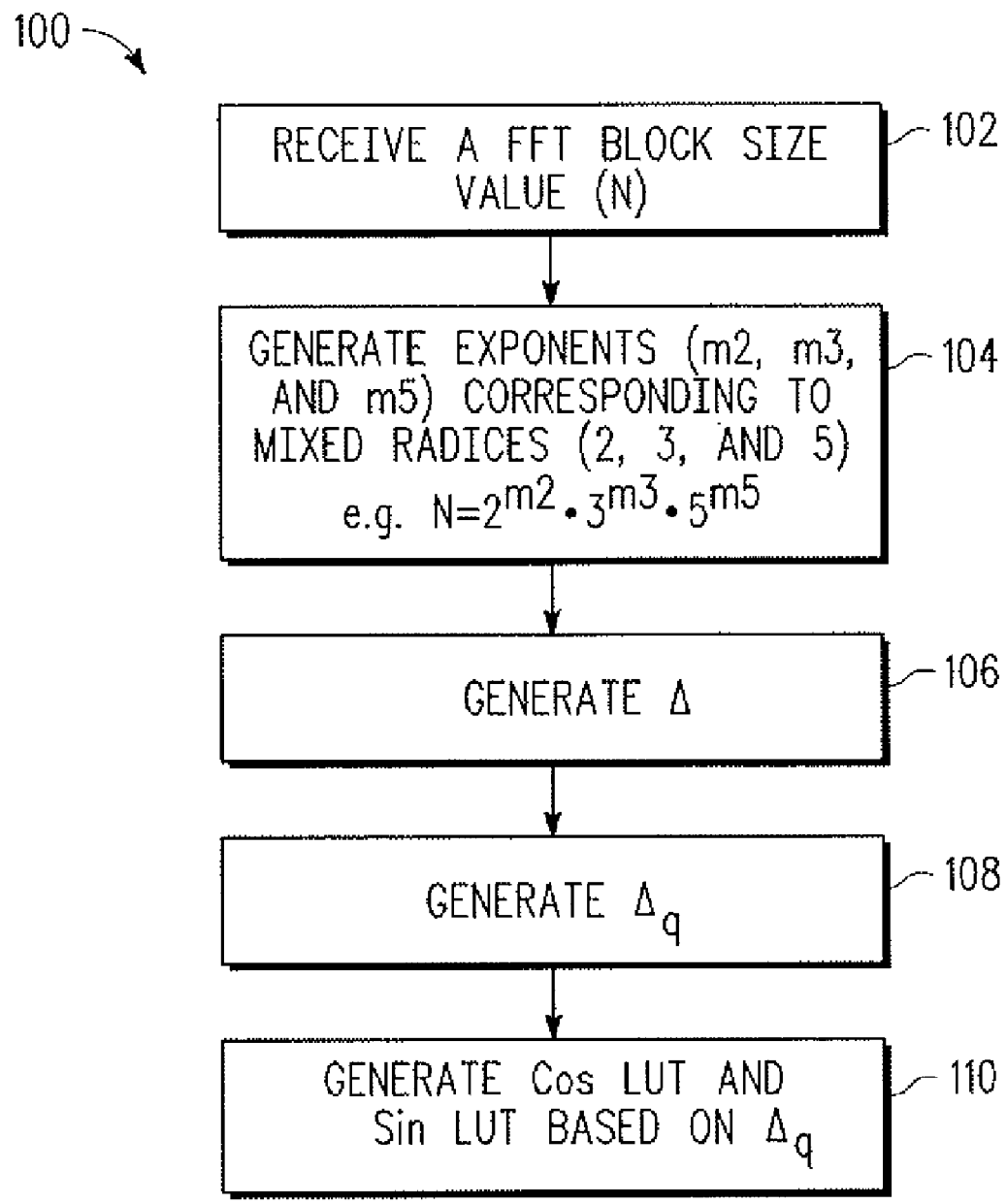
FIG. 5 is a flow chart corresponding to a method for generating look up tables based on twiddle factors.

FIG. 5 is a flow chart corresponding to a method for generating look up tables based on twiddle factors. The method may include receiving a discrete Fourier transform (DFT) block size, N (step 102), wherein the block size N includes a first radix that is a power of 2 and a second radix that is not a power of 2 is provided. The method may further include generating an exponent corresponding to each of the first radix and the second radix (step 104). For example, exponents m2, m3, and m5 for storage in table 50 may be generated by factoring the block size N, where m2 is the number of factor 2's, m3 is the number of factor 3's, and m5 is the number of factor 5's. In another example, exponents m2, m3, and m5 may be obtained from a look-up table indexed by N or provided through user instructions. The method further includes using the generated exponents to generating a first delta value ($\Delta$) (step 106), representing a ratio of a maximum block size to the block size, wherein the maximum block size includes at least one radix that is not a power of 2. The method further includes generating a second delta value ($\Delta q$) (step 108), representing a ratio of a modified maximum block size to the block size, wherein the modified maximum block size is a power of 2. The method further includes based on the second delta value, generating at least one look-up table corresponding to twiddle factors of the DFT having the block size, N. By way of example, in this step Cos LUT and Sin LUT components may be generated. The method further includes storing the at least one look-up table for use in performing a DFT transform of a communications signal.

Circuit details are not explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary signal processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Processor 10 or portions thereof may be soft or code representations of physical circuitry or of logical representations convertible into physical circuitry. As such, processor 10 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. In a data processing system having a twiddle factor unit, a method for performing a mixed-radix discrete Fourier transform (DFT) having a block size, N, and a maximum block size, Nmax, wherein the maximum block size includes a radix that is not a power of 2, the method comprising:
   receiving a delta value at an input of the twiddle factor unit, the delta value representing a ratio of a modified maximum block size to the block size, wherein the modified maximum block size is a power of 2;
   using the delta value to obtain a step size for generating indices of a look-up table stored within the twiddle factor unit, wherein the look-up table stores real and imaginary components of twiddle factors corresponding to a set of block sizes of the DFT; wherein the look-up table includes a precoded communication signal based on the twiddle factors; and
   in response to each generated index, outputting from the look-up table, a real and imaginary component of the twiddle factor corresponding to the DFT having the block size N, and providing the precoded communication signal for an up-link transmission to a base station.

2. The method of claim 1, further comprising:
   receiving a time domain signal; and
   using the real and imaginary components of the twiddle factor to generate a frequency domain signal corresponding to the time domain signal.

3. The method of claim 2, wherein the time domain signal is further characterized as a non-precoded communication signal.

4. The method of claim 2, wherein the time domain signal is further characterized as a precoded communication signal.

5. The method of claim 1, further comprising using the delta value to obtain a starting value for generating the indices.

6. The method of claim 5, wherein the using the delta value to obtain a starting value comprises using the delta value to obtain a plurality of starting values, each corresponding to a different twiddle factor generator, each twiddle factor generator including a look-up table.

7. The method of claim 6, further comprising:
   using the step size and the plurality of starting values to generate corresponding indices for each of the different twiddle factor generators, wherein each twiddle factor generator, in response to each corresponding generated index, in parallel, outputs a real and imaginary component of a twiddle factor.

8. The method of claim 1, further comprising rounding each generated index prior to outputting the real and imaginary component of the twiddle factor.

9. The method of claim 1, wherein the block size, N, includes a radix that is not a power of 2.

10. A data processing system which performs a mixed-radix discrete Fourier transform (DFT) having a block size, N, and a maximum block size, Nmax, wherein the maximum block size includes a radix that is not a power of 2, the data processing system comprising:
    a twiddle factor unit which outputs a plurality of twiddle factors, the twiddle factor unit comprising:
       an input which receives a delta value representing a ratio of a modified maximum block size to the block size, wherein the modified maximum block size is a power of 2;
       an increment calculator which uses the delta value to generate a step size;
       a start value calculator which uses the delta value to generate a plurality of start values; and
       a plurality of twiddle factor generators, each twiddle factor generator comprising a first look-up table storing first components of twiddle factors corresponding to a set of block sizes of the DFT and a second look-up table storing second components of the twiddle factors corresponding to the set of block sizes of the DFT, wherein the first look-up table and second look-up table includes a precoded communication signal based on the twiddle factors; and wherein each twiddle factor generator uses the step size and a corresponding one of the plurality of start values to generate indices for each of the first and second look-up tables, and, in response to each generated index, provides a real component and an imaginary component, from the first and second look-up tables, of a twiddle factor corresponding to the DFT having the block size, N, and provides the precoded communication signal for an up-link transmission to a base station.

11. The data processing system of claim 10, further comprising:
    an input which receives a time domain signal;
    an arithmetic logic unit which applies the twiddle factors corresponding to the DFT having the block size, N, to generate a frequency domain signal corresponding to the time domain signal.

12. The data processing system of claim 10, wherein each twiddle factor generator further comprises a rounding unit which rounds each generated index prior to providing the real and imaginary components of the twiddle factor corresponding to the DFT having the block size, N.

13. The data processing system of claim 10, further comprising:
    an input which receives a precoded communication signal; and
    circuitry which uses the twiddle factors corresponding to the DFT having the block size, N, to decode the communication signal.

14. The data processing system of claim 10, wherein the block size, N, includes a radix that is not a power of 2.

15. A method, comprising:
    receiving a discrete Fourier transform (DFT) block size, N, wherein the block size N includes a first radix that is a power of 2 and a second radix that is not a power of 2;
    generating an exponent corresponding to each of the first radix and the second radix;
    using the generated exponents to generating a first delta value representing a ratio of a maximum block size to the block size, wherein the maximum block size includes at least one radix that is not a power of 2;

generating a second delta value representing a ratio of a modified maximum block size to the block size, wherein the modified maximum block size is a power of 2;

based on the second delta value, generating at least one look-up table corresponding to twiddle factors of the DFT having the block size, N; and storing the at least one look-up table for use in performing a DFT transform of a communications signal.

16. The method of claim 15, wherein generating the at least one look-up table comprises:

generating a first look-up table corresponding to first components of the twiddle factors of the DFT having the block size, N; and generating a second look-up table corresponding to second components of the twiddle factors of the DFT having the block size, N, wherein, for each twiddle factor, the first component is one of a real or imaginary component and the second component is another one of the real or the imaginary component.

* * * * *